United States Patent [19]

Desombre et al.

[11] 3,987,395
[45] Oct. 19, 1976

[54] ARRANGEMENT OF HIGH FREQUENCY PULSE REGENERATIVE REPEATERS

[75] Inventors: Patrice Desombre, Tregastel; Jean-Pierre Steun, Lannion, both of France

[73] Assignee: Compagnie Industrielle des Telecommunications Cit-Alcatel, Paris, France

[22] Filed: June 20, 1975

[21] Appl. No.: 588,956

[30] Foreign Application Priority Data
June 28, 1974 France .............................. 74.22737

[52] U.S. Cl. ............................. 325/2; 340/146.1 C
[51] Int. Cl.² ........................................ H04B 7/00
[58] Field of Search ............ 325/2, 13; 340/146.1 C, 340/146.1 AX; 178/70 R; 179/15 BF

[56] References Cited
UNITED STATES PATENTS
3,873,775  3/1975  Chown ................................. 325/2 X Primary Examiner—Harold I. Pitts
Attorney, Agent, or Firm—Haseltine, Lake & Waters

[57] ABSTRACT

The invention concerns regenerative repeaters for pulses. The method consists of detecting errors, coding them and recording them in a channel of a tele-locating frame. Each regenerative repeater of a connection has a channel which is attributed to it, for example channel i, for the repeater whose order is i. The device implementing the method comprises means for directing the tele-locating signals at the input of the repeater, memorizing them and applying them to a low-frequency modulator which reinjects them into a directing means at the output of the repeater; it comprises also means for detecting the channel whose order is i and recording therein the coded proportion of error of the repeater.

7 Claims, 8 Drawing Figures

ARRANGEMENT OF HIGH FREQUENCY PULSE REGENERATIVE REPEATERS

BACKGROUND OF THE INVENTION

The invention has as its objects a device for enabling the tele-monitoring of high-frequency pulse regenerative repeaters and providing a connection between two terminal stations and the tele-locating of defective regenerative repeaters, in the case where the regenerative repeaters have only one transmitting direction. In the following disclosure, for the sake of clearness, the word repeater will be used instead of the expression regenerative repeater.

The fundamental principle adopted up till now in repeaters, for example in transmissions of digital trains of 2.048M bits per second, consists in looping the outgoing direction with the in-coming direction at the level of a two-way repeater in the connection. In the case of simple repeaters, the problem must be reconsidered.

It is a method to equip the repeaters with an error detector constituted as a function of the coding method used in the connection for example, among others, a bipolar error detector to detect violation of a bipolar code if the transmission is effected according to bipolar coding.

SUMMARY OF THE INVENTION

The invention provides for each repeater to be equiped with an error counter whose output feeds a proportion of error coder and means for recording the p pulses of the coding of its proportion of error on a channel of a "frame" which comprises at least pM clock instants, where M represents the number of repeaters eqipping the connection.

The frame is divided into a certain number of intervals in time which will be designated by the word "channels"; a frame is composed of a locking word and at least M channels numbered 1 to M starting from the locking word. The frame leaving the first repeater of the connection therefore contains the first p-pulse channel coding the proportion of error of the first repeater in that state; it enters the tele-locating circuit of the second repeater which in its records its proportion of error coded on the p pulses of the second channel of the frame and so on until the last repeater of the connection, generally followed by a terminal station which is equipped with means for decoding and displaying the proportions of error of each repeater.

Each beginning of a frame is marked by the "frame locking word" VT. The decoding of the frame locking word VT situates the origin of the succession of the repeaters. On receiving, each repeater is therefore characterized by its order in the frame starting from the frame locking, with the indication of its proportion of error, the order corresponding to a channel number.

The clock of the frame is chosen, to great advantage, at a very low frequency $f$, for example $f = 30$ c/s and modulates a low-frequency carrier F, for example $F = 500$ c/s.

That carrier whose frequency is F modulated by signals coming from the clock of the frame whose frequency is $f$, accompanies the data signal on the transmission line between the repeaters. At the input of the repeat whose order is i, it is shunted towards its tele-locating circuit by a first directing unit, then, after having received the recording of the code of the corresponding proportion of error, is re-injected in the transmission line by a second directing unit, towards the repeat whose order is $i + 1$.

If the tele-locating circuit of the repeater whose order is $i - 1$ no longer operates, either because of a breakdown of its tele-locating circuit, or because of a failure in the feeding of the repeater, a carrier whose frequency is F no longer reaches the repeater whose order is i. A carrier wave whose frequency is F provided with a frame locking word VT is generated in the repeater whose order is $i$ and applied to the tele-locating circuit; it enables the analysing of the remaining repeaters of the connection, up to the receiving terminal station. Counting the number of repeaters which have responded, the order to the repeater which has broken down will be determined.

BRIEF DESCRIPTION OF THE DRAWINGS

The invention will be well understood from the description of an example of embodiment illustrated by the figures in which.

DESCRIPTION OF THE PREFERRED EMBODIMENTS

Figure 1:
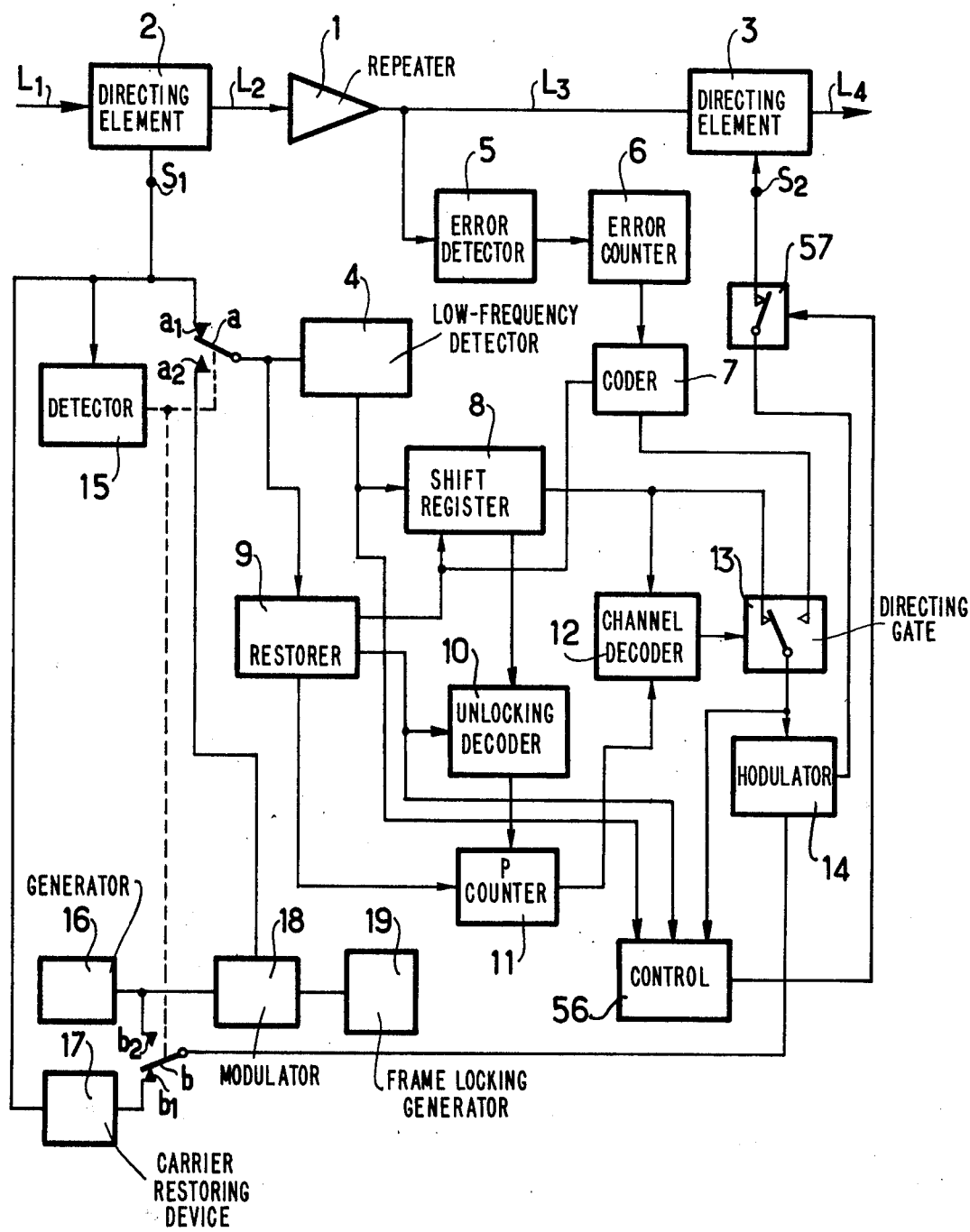
FIG. 1 shows a device for the monitoring and tele-locating of a repeater.

FIG. 1 shows a device for the tele-monitoring and tele-locating of a repeater 1 which receives the data through a line L2 and transmits them through a line L3; a directing element 2 and a directing element 3 are situated respectively before and after the repeater 1. The directing element 2 extracts the low-frequency signal F from the data transmitted by the line L1; the low-frequency signal is available on the terminal S1 connected to the break contact a1 of an inverter $a$ connected to a low-frequency detector 4 which eliminates the carrier, whose frequency is 500 c/s, for example, and keeps its modulation waveform. The output of the low-frequency detector 4 is connected to a shift register 8 which effects the forming of the signals constituting the modulation waveform of the signal and ensures the memorizing thereof.

A clock restoring device 9 connected to the inverter $a$ receives the low-frequency signal F of the directing element 2 and sends out clock signals H whose frequency is 30 c/s, for example, which modulate the carrier. The clock signals H are applied to the shift register 8 whose output is connected to a directing gate 13; as will be explained hereinbelow, the signals leaving the shift register 8 are applied to the modulator 14 as long as the channel reserved for the repeater 1 is not detected in the frame of the tele-locating signal. That modulator 14 receives a low-frequency wave F from the carrier restoring device 17 whose input is connected to the terminal S1 of the directing element 2; the output of the modulator 14 is connected to the terminal S2 of the directing element 3 which applies the signal coming from the modulator on the line L4 in the direction of another repeater.

At the output of the repeater 1, error detector 5, of a type known per se, is connected to the line L3 and sends out a signal to an error counter 6 each time an error has been detected in the code used for the transmitting of the data; if, for example, a bipolar code is used, the error detector 5 consists of a detector of violation of the bipolar code in order to determine the proportion of error, the counting of the errors is effected during a given time shorter than the duration of a frame; the reading of the error counter 6 is transmitted to a coder 7 driven by clock signals H coming from the clock restoring device 9; the proportion of error coded by the coder 7 is applied to the modulator 14 through the directing gate 13 when the channel attributed to the repeater 1 appears in the frame of the tele-locating signal.

An unlocking decoder 10 receives the signal coming from the shift register 8 and detects the frame locking word which it decodes; the locking decoder is driven by the clock signals H leaving the clock restoring device 9 and its output is connected to a modulo p counter 11, also driven by the clock signals H; when the locking decoder detects the frame locking word, it controls the resetting to zero of the modulo p counter 11 which will therefore begin again to count the pulses of the clock signal H and sends out, at the output, one pulse at every p pulses of the clock signal H, that pulse being applied to a channel decoder 12 which receives the signals coming from the shift register; the channel decorder 12 detects and counts the pulses existing in each channel of the frame and when it finds p pulses, it sends out a signal to the directing gate 13 which then allows the transmitting of the proportion of errors coded leaving the coder 7 in the direction of the modulator 14; when there is no signal from the channel decoder 12, the directing gate allows the transmitting of the signals leaving the shift register 8 towards the modulator 14; the output of the modulator is connected through the switch 57 to the terminal S2 of the directing element 3 which ensures the re-injecting of the tele-locating signals in the line L4.

To sum up, it will therefore be seen that the modulation waveform of the low-frequency signal F is detected in the low-frequency detector 4. That modulation waveform results from the proportions of error recorded in the channels of the tele-locating frame corresponding to the various repeaters which precede the repeater 1. After having passed in the shift register 8, the modulation waveform of the low-frequency signal F is applied to the modulator 14 and re-injected in the line L4 through the directing element 3. When the first free channel of the frame, that is, the one not containing any indication of proportion of error, is detected by means of the channel decoder 12, the proportion of error corresponding to the repeater 1 is recorded therein. That proportion of error is applied to the modulator 14 and re-injected in the line L4. Of course, the following channels, which are free, since they are attributed to following receivers, do not contain any proportion of error date. The modulation waveform of the corresponding low-frequency signal F is transmitted to the modulator 14 to be re-injected in the line L4.

If the tele-locating circuit of the repeater preeceding the repeater 1 no longer operates, either because of a breakdown of the circuit itself, or because of a failure in the feeding of the repeater, no more monitoring data is received at the repeater 1 which is the first after the defective repeater. To overcome that drawback, a long absence in the arrival of the low-frequency signal F is detected at each repeater. That absence reflects the breakdown of the preceeding repeater and a low-frequency signal F, having the same frequency as that which ought to have been received, as well as a frame locking word which will thus fix the beginning of the chain of repeaters in proper operating condition. Since by counting the channels of the frame having porportion of errors data, it will be possible to know the number of the first of that chain. Hence the number of the preceding repeater, which is defective, is generated in the repeater itself.

FIG. 1 shows a generator 16 for that purpose whose output is connected, on the one hand, to a modulator 18 and on the other hand, to the make contact $b2$ of an inverter $b$. The modulator 18 also receives the signal corresponding to the frame locking word sent out by the frame locking generator 19. The output of the modulator 18 is connected to the make contact of the inverter $a$.

A detector of long absences 15 detects the absences of low-frequency signals F during a period in the order of ten seconds, for example, and controls the inverters $a$ and $b$. The device for restoring the carrier 17, which has already been mentioned, is connected to the break contact $b1$ of the inverter $b$. When an absence of low-frequency signal F is detected by the detector of long absences 15, the latter controls the inverters $a$ and $b$ which change over from the break position, contacts $a1$, $b1$ in the make position, contacts $a2$, $b2$. Of course, in the case of the breakdown of a repeater, several repeaters which follow it will emit a frame locking word, but after a short time, shorter than a few seconds, only the repeater which immediatly follows the defective repeater will emit a frame locking word which will drive all the following repeaters.

If the tele-locating device described in FIG. 1 allows the low-frequency signal F to pass but either does not regenerate correctly the frame locking word, or does not bring in the proportion of error of the repeater concerned, the monitoring data is erroneous and the position of the defective ele-locating device is not known. It is, therefore, necessary to check that these two operations are carried out properly and for that purpose, an absence either of a frame locking word or of an extra pulse between the in-coming and out-going signals of the repeater is detected with the control device 56. In both the cases, the output signal is stopped by the switch 57 controlled by the control device 56 and the emission begins at the following repeater. By analysis of the received signal, the position of the defective tele-locating device is known.

The knowledge of the breakdowns of the tele-locating devices requires a low-frequency generator as has been described before. This enables the emitting of an emitting device at a distant terminal, at the end of the line, since it is the last repeater of the connection and hence the first of the tele-locating chain, which will send out the low-frequency signal F which acts as a time base for the set of repeaters.

Figure 2:
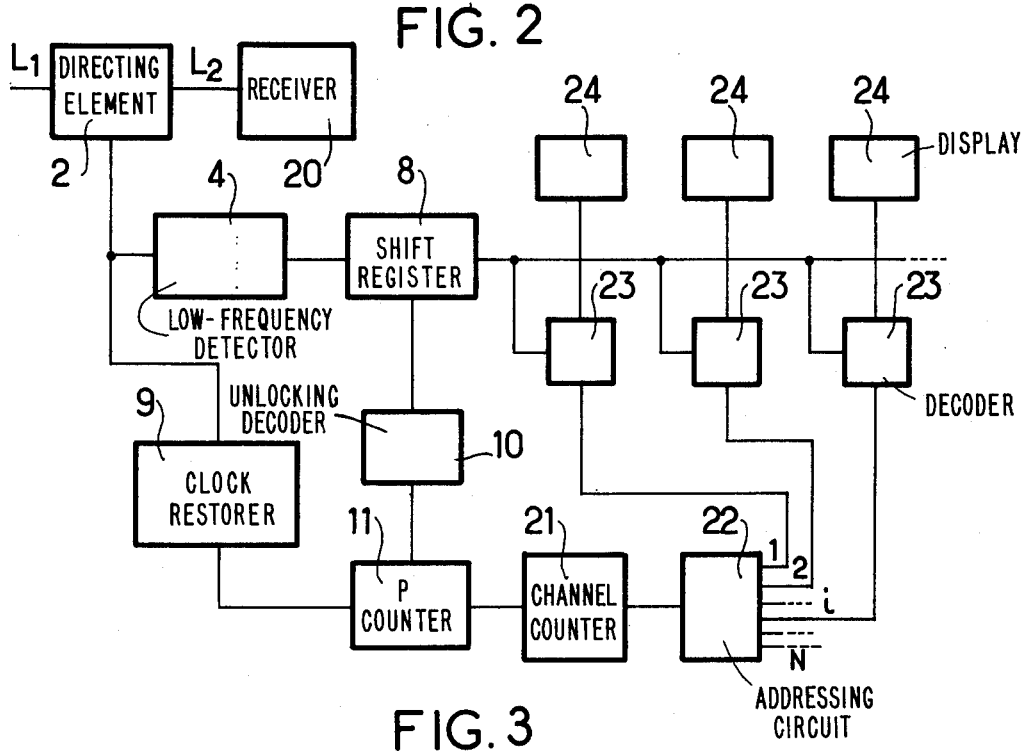
FIG. 2 shows the device for receiving tele-locating signals at a line terminal.

FIG. 2 shows the device for receiving the tele-locating signals at a line terminal. A directing element 2 receives signals from the line L1 and transmits the digital data on the line L2 to a receiving circuit 20 of a line terminal. This figure shows the same elements:

low-frequency detector 4 clock restoring device 9, shift register 8, unlocking decoder 10, and modulo $p$ counter 11, as in FIG. 1. The output of the modulo p counter is connected to a channel counter 21 enabling the counting of the N channels of a tele-locating frame. The output of the channel counter 21 is connected to an addressing circuit 22 comprising N outputs, for example a hundred, if the frame comprises a hundred channels. There are any number of repeaters in the connection, but at the most a hundred. Each of the N outputs of the addressing circuits is linked to a decoder of proportion of error 23 which also receives the signals coming from the shift register 8. The output of each decoder of proportion of errors is connected to a display unit 24 which enables the displaying of the proportion of error of the repeaters. There are, of course, as many display units as there are repeaters.

Figure 3:
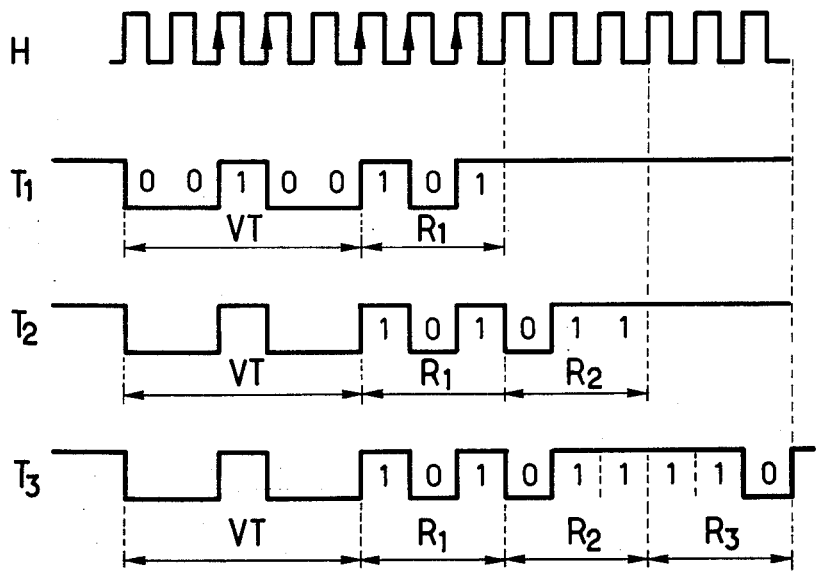
FIG. 3 shows the clock signals H and the frame signals, with the locking word, at the output of each of the first repeaters of a connection.

FIG. 3 shows the clock signals H and the frame signals at T1, T2, T3. The clock signals H are those which are used for modulating the low-frequency carrier P. They have, for example, a frequency of 500 c/s; the clock signals H have, for example a frequency of 30 c/s. The beginning of a tele-locating frame with the frame locking word VT and with the porportion of error of the first repeater of a connection at R1, have been shown at T1. The frame after the recording of the proportion of error of the second repeater of the connection at R2 has been shown at T2, and the frame after recording of the proportion of error of the third repeater of the connection at R3 is shown at T3. R1, R2, R3 represent respectively the first, second and third channels of the frame. By way of an example, a proportion of error comprised between $10^{-5}$ and $10^{-3}$, is shown at R1. A proportion of error less than $10^{-5}$ is shown at R2 and a proportion of error greater than $10^{-3}$ is shown at R3. It will, therefore, be seen that the recording of the proportions of error in a channel of the frame is effected by cancelling of the low-frequency signal F during a clock signal period H. Thus, when the channel decoder 12 in FIG. 1 detects successively, between two pulses coming from the divider counter 11, three levels 1 of the signal which it receives from the shift register 8, it controls the directing gate 13. The existence of three levels 1 means that the corresponding channel does not contain any data concerning the proportion of error and that the channel is that reserved for the repeater 1 (which is not necessarily in FIG. 1), the first of the connection. It has been assumed, by way of an example, that each channel of the frame was divided into three intervals, but of course, each channel can be divided into $p$ intervals, in order to transmit more data relating to the operation of the repeaters. The modulo $p$ counter 11 in FIG. 1 would then send out a pulse at every $p$ clock signal period.

Figure 4:
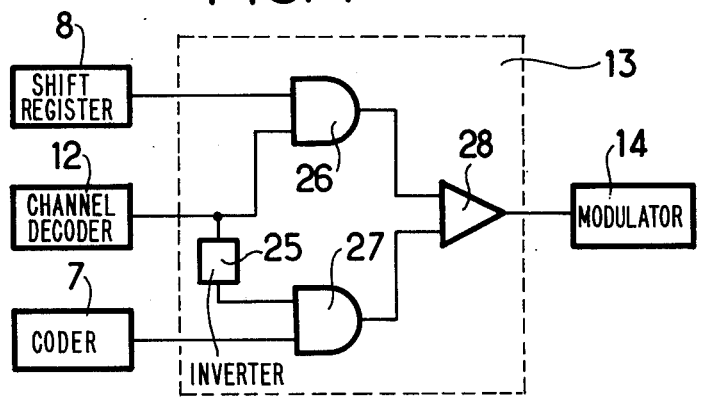
FIG. 4 shows an example of embodiment of the directing gate 13.

FIG. 4 shows, by way of an example, an embodiment of the directing gate 13 shown diagrammatically in FIG. 1. It comprises two AND gates 26 and 27 and an OR gate 28; the AND gate 26 has two inputs connected respectively to the shift register 8 and to the channel decoder 12. The AND gate 27 has two inputs one of which is connected to the coder 7 and the other of which is connected to the channel decoder 12 through an inverter 25. The outputs of the AND gates 26 and 27 are connected respectively to an input of the OR gate 28 whose output is connected to the modulator 14. The channel decoder 12 sends out at the output a 1 as long as it has not detected three 1's in a channel, or p 1's in a general way. Under these conditions, only the AND gate 26 is conductive when the output signal of the shift register is a 1 and the modulator 14 receives, therefore, from the OR gate 28, a signal identical to that sent out by the said shift register. When the channel decoder 12 detects a free channel, that is, a channel whose corresponding signal comprises three 1's, it sends out a signal 0 at the output. This blocks and AND gate 26 and frees the AND gate 27 which then receives a 1 from the inverter 25. The output signal of the decoder 7, that is, the proportion of error of the repeater, is then applied to the modulator 14 through the AND gate 27 and through the OR gate 28.

Figure 5:
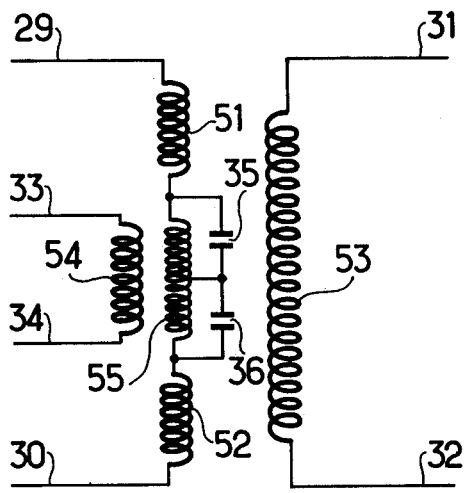
FIG. 5 shows a directing element.

FIG. 5 shows an example embodiment of a directing element which comprises a first transformer having two winding 51 and 52 at the primary and one winding 53 at the secondary and a second transformer having one primary winding 54 and one secondary winding 55 inserted between the two windings 51 and 52. Capacitors 35 and 36 are connected between the mid-point of the said winding 55 and each of its ends. These capacitors have a capacity in the order of a few thousands of picofarads and are intended to allow the high frequencies of the high-frequency data transmitted by the repeaters to pass, whereas they have no action on the tele-locating signals. In the case of a directing element such as 2 in FIG. 1, the wires 29 and 30, which are connected respectively to the free ends of the windings 51 and 52, constitute the line L1. The wire 31 and 32 connected to the ends of the windings 53 constitute the line L2. The wiress 33 and 34 connected to the winding 54 constitute the output (terminal S1) of the directing element 2 on which the tele-locating signals are collected. In the case of a directing element such as 3 in FIG. 1, the wire 29 and 30, which are connected respectively to the free ends of the windings 51 and 52 constitute the line L3. The wires 31 and 32 connected to the ends of the winding 53 constitute the line L4. The wires 33 and 34 connected to the ends of the winding 54 constitute the input (terminal S2) of the directing element 3 to which the tele-locating signals coming from the modulator 14 are applied.

Figure 6:
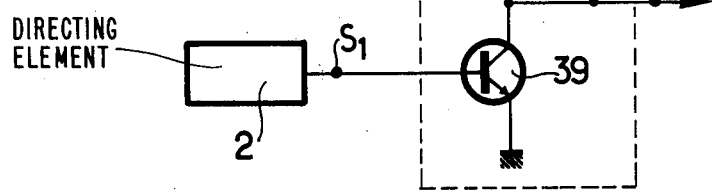
FIG. 6 shows a detector of long absences.

FIG. 6 shows an example of embodiment of a detector 15 of long absences. It comprises a transistor 39 whose base is connected to the terminal S1 of the directing element 2, whose emitter is grounded and whose collector is connected to the positive polarity of a supply source through a circuit constituted of a resistor 37 and a capacitor 38 in parallel to the resistor. The terminal S3 constitutes the output of the detector of long absences. During normal operation, that is, when there is a tele-locating signal, the output signal is a 0, and the transistor 39 is blocked. In the case of a long absence of the tele-locating signal, the output signal on the terminal S3 assumes the value 1 after a certain time corresponding to the time constant RC of the circuit, formed by the resistor 37 and the capacitor 38.

Figure 7:
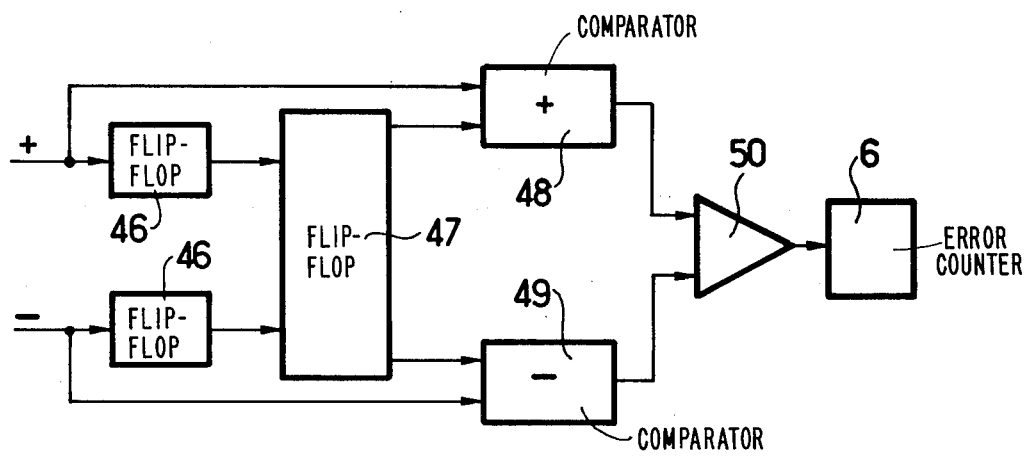
FIG. 7 shows an example of embodiment of a bipolar error detector.

FIG. 7 shows an example of embodiment of an error detector such as 5 for detecting the errors of a bipolar code. It comprises two flip-flops 46 one of which receives the positive pulses. The other receives the negative pulses of the coded data which they transmit, with a delay of one clock signal period, to a flip-flop 47 which transmits the positive pulses to a comparator 48 and the negative pulses to a comparator 49. The comparator 48 receives also the positive pulses which are not delayed, and the comparator 49 received also the negative pulses which are not delayed. If there is, simultaneously, in a comparator, a delayed pulse and a pulse which is not delayed, the comparator sends out a signal 1 to an OR gate connected by its output to the error counter 6.

Figure 8:
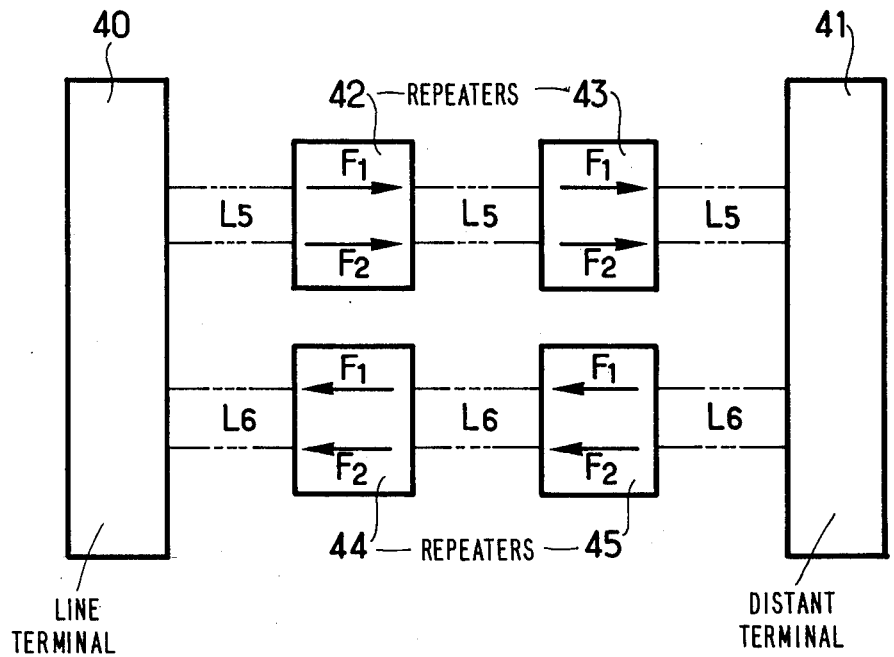
FIG. 8 shows an example of a connection between two terminals.

FIG. 8 shows an example of a connection between a line terminal 40 and a distant terminal 41. A set of repeaters 42, 43 ensures the connection in the outgoing direction between the line terminal 40 and the distant terminal 41. The arrow F1 indicates direction of transmission of the data which is transmitted by the line L5. The tele-locating signals are transmitted by the same line L5 and the direction of propagation of the tele-locating is shown by the arrow F2. A set of repeaters 44, 45 ensures the connection in the in-coming direction between the distant terminal 41 and the line terminal. The arrow F1 shows the direction of transmission of the data which is transmitted by the line L6. The tele-locating signals transmitted by that same line L6 and the direction of propagation of the tele-locating is shown by the arrow F2. The line terminal 40 comprises a data emitter on the line L5, a data receiver coming on the line L6, and a tele-locating receiver coming on the line L6 from the repeater 44. It comprises a tele-locating emitter which emits the low-frequency signals on the line L5 in the direction of the repeater 42. At the distant terminal 41, the line L5 coming from the repeater 43 is connected directly to the line L6 going the repeater 45 so that the repeaters 42, 43 and 45, 44 record, in the channels of a frame, their proportion of error. The frame comprises, of course, at least as many channels as there are repeaters for the two directions of transmission of the data. As a variant, as has been said, the line terminal 40 does not comprise any tele-location signal emitter and it is the repeater 42 which ensures the amitting of the tele-location signals.

Examples of embodiment of certain elements which have been illustrated by FIGS. 4, 5 and 6 have been given but the set of different elements or devices used and represented in FIG. 1 are conventional and well known by persons skilled in the art. To great advantage, they will be produced in the form of integrated circuits and more particularly in CMOS (complementary MOS) technology.

It must be understood that the invention is not limited to the examples of embodiments described and illustrated and it would be possible, without going beyond the scope of the invention, to modify certain means or devices, or, again, to use equivalent means.

We claim:

1. Device for tele-monitoring and tele-locating pulse regenerative repeaters equipping a connection and comprising, combined with each repeater:
   means for detecting errors;
   a means for counting the errors;
   a coder for coding the errors; a first directing means for directing tele-locating signals at the input of the repeater, said tele-locating signals being constituted by a low-frequency carrier modulated by very low-frequency clock signals and forming a repetitive frame having at least as many channels as there are repeaters in the connection, each channel being attributed to a repeater, said frame beginning by a frame locking word;
   means for restoring clock signals in the tele-locating signal;
   means for restoring the carrier, connected to an output of the first directing means;
   means for eliminating the low-frequency carrier of the tele-locating signal and for sending out a modulation waveform signal of said tele-locating signal;
   means for detecting, in each frame of the tele-locating signal, the channel whose order corresponds to that of the repeater;
   a modulator controlled by said means for detecting the channel corresponding to the repeater and fed with low-frequency current by said means for restoring the carrier;
   a directing signal for directing either a signal sent out by said coder, or the modulation waveform signal of the said tele-locating signal, towards the modulator;
   a second directing means for directing, at the output of the repeater, signals sent out by said modulator.

2. Device for tele-monitoring and tele-locating a repeater according to claim 1, wherein said means for eliminating the carrier and sending out a modulation waveform signal comprises a low-frequency detector and a shift register in which is recorder the modulation waveform signal, said shift register being connected to said directing gate.

3. Device according to claim 2, wherein said means for detecting the channel of the repeater comprises a channel decoder which counts and detects at each channel the pulses transmitted by the shift register.

4. Device according to claim 2, including a sub-assembly comprising a generator of a low frequency, a frame locking generator, a modulator energized on the one hand by the said generator and on the other hand by said frame locking generator, a detector of long absences acting in case of prolonged absence on two inverters connecting the input of the low-frequency detector to the output of the modulator and an input of the modulator to the output of the generator.

5. Device according to claim 4, wherein said shaft register is controlled by a clock restoring device connected at the input to the inverter, sending out clock signals at the modulation frequency of the low-frequency carrier.

6. Device according to claim 2, wherein said channel decoder has a structure of pulses comprising an empty channel of the frame.

7. Device according to claim 6, wherein said channel decoder receives a reading order coming from the clock restoring device by means of a module counter synchornized by the frame locking word decoded at the output of the shift register by a locking decoder.

* * * * *